United States Patent [19]
Kitami

[11] Patent Number: 5,668,962
[45] Date of Patent: Sep. 16, 1997

[54] WINDOW MANAGING SYSTEM FOR SELECTING A WINDOW IN A USER DESIGNATED IDENTIFIER LIST

[75] Inventor: Toshikazu Kitami, Kanagawa, Japan

[73] Assignee: Fuji Xerox Co., Ltd., Tokyo, Japan

[21] Appl. No.: 475,829

[22] Filed: Jun. 7, 1995

Related U.S. Application Data

[63] Continuation of Ser. No. 188,364, Jan. 28, 1994, abandoned, which is a continuation of Ser. No. 595,615, Oct. 10, 1990, abandoned.

[51] Int. Cl.$^6$ .................................................. G06F 15/00
[52] U.S. Cl. .......................................................... 345/340
[58] Field of Search ........................ 395/155–161; 345/117–120

[56] References Cited

U.S. PATENT DOCUMENTS

| | | | |
|---|---|---|---|
| 4,574,364 | 3/1986 | Tabata et al. | 395/157 |
| 4,688,167 | 8/1987 | Agarwal | 395/157 X |
| 4,712,191 | 12/1987 | Penna | 395/159 |
| 4,713,754 | 12/1987 | Agarwal et al. | 395/157 X |
| 4,760,390 | 7/1988 | Maine et al. | 395/157 X |
| 4,769,762 | 9/1988 | Tsujido | 395/157 |
| 4,812,998 | 3/1989 | Maeda | 395/157 |
| 4,862,389 | 8/1989 | Takagi | 395/156 |
| 4,896,290 | 1/1990 | Rhodes et al. | 345/118 X |
| 4,899,136 | 2/1990 | Beard et al. | 395/157 |
| 4,905,168 | 2/1990 | McCarthy et al. | 395/157 X |
| 5,046,001 | 9/1991 | Barker et al. | 395/158 |
| 5,091,866 | 2/1992 | Takagi | 395/157 X |
| 5,142,615 | 8/1992 | Levesqua et al. | 395/157 X |
| 5,237,653 | 8/1993 | Noguchi et al. | 315/158 |
| 5,305,435 | 4/1994 | Bronson | 395/159 |

FOREIGN PATENT DOCUMENTS 1267725  10/1989  Japan .............................. G06F 3/14

OTHER PUBLICATIONS

Microsoft Windows User's Guide v. 3.0, Microsoft Corp., 1990, pp. ix–xiii, 26–27, 54–57, 79–83, 96–97.
McMullen et al., "Microsoft Introduces Windows 3.0", Newsbytes, May 24, 1980, pp. 1–2.
Horowitz et al, "Fundamentals of Data Structures in Pascal", Comp. Sci. Press, 1985, pp. 94–103, 144–147.
Microsoft Windows User's Guide v. 2.0, Microsoft Corp., 1987, pp. 23, 81–85, 89.
Advanced Interface Design Guide, IBM, Jun. 1989, pp. 95–101.
Advanced Interface Design Guide, IBM, Jun. 1989, pp. 39–41, 121–123, 126–130.
Microsoft Windows User's Guide v. 3.0, Microsoft Corp., 1990, pp. 5–76.

*Primary Examiner*—Mark R. Powell
*Assistant Examiner*—John E. Breene
*Attorney, Agent, or Firm*—Finnegan, Henderson, Farabow, Garrett & Dunner, L.L.P.

[57] ABSTRACT

An improved window managing system which displays and manages a plurality of windows on a display comprises window identifier list storage which stores a window identifier list having window identifiers designated by the user from among all displayed windows in the window system. In essence, the identifier list is a limited subset of all opened windows currently operating on the window system. In response to each depression of a key on the keyboard, a window is sequentially selected from the window identifier list.

5 Claims, 4 Drawing Sheets

WINDOW MANAGING SYSTEM FOR SELECTING A WINDOW IN A USER DESIGNATED IDENTIFIER LIST This application is a continuation of application Ser. No. 08/188,364 filed Jan. 28, 1994, now abandoned, which is a continuation of application Ser. No. 07/595,615 filed Oct. 10, 1990, now abandoned.

BACKGROUND OF THE INVENTION

1. Field of the Invention

This invention relates to a window managing system that displays and manages a plurality of windows on a display.

2. Discussion of the Related Art

In the operation of a multiwindow system, it is necessary to indicate which of the windows displayed is associated with certain data entered from a keyboard. To meet this need, the window associated with input data is conventionally designated by means of a mouse or selected by operation on the keyboard. When using a mouse, the operator must move his or her hand from the keyboard each time the window associated with input data is to be designated by the mouse. However, the need to move one's hand between the keyboard and the mouse each time a window is designated is cumbersome.

The second discussed method uses the keyboard to select the necessary window. The number of windows that can be designated by operating the keyboard is limited and also it is cumbersome to select the proper window from many "open" windows.

SUMMARY OF THE INVENTION

The present invention has been made in view of the above circumstances and has as an object facilitating the procedure of selecting a window in a multiwindow system.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the window managing system of this invention which displays and manages a plurality of windows on a display comprises a window identifier list storage means which stores a window identifier list having loaded therein the identifiers of a plurality of windows from which the window associated with a certain input can be selected, and an input associated window selector means which, in response to each depression of a specific key, selects the input associated window on the basis of the window identifier list.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention.

DETAILED DESCRIPTION OF THE PREFERRED EMBODIMENT

Figure 1:
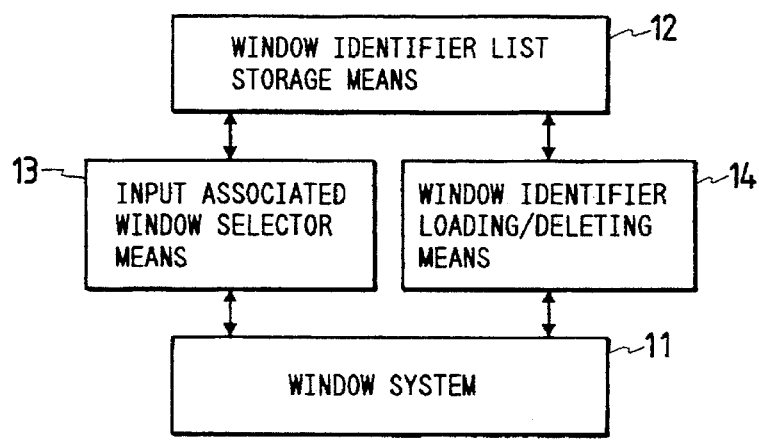
FIG. 1 is a block diagram showing the basic concept of the present invention.

FIG. 1 is a block diagram showing the basic concept of the present invention. As embodied herein, window identifier list storage means 12 stores a window identifier list having loaded therein the identification of a plurality of windows from which the window associated with a certain input can be selected. In response to each depression of a specific key, an input associated window selector means 13 selects the input associated window on the basis of the window identifier list.

The window managing system of this invention may further include window identifier loading/deleting means 14, which loads or deletes the identifier of a designated window from the window identifier list.

In window systems, individual windows created are identified and their functions are managed by the associated window identifiers. In the window managing system of the present invention, windows from which a suitable window to be associated with a certain input can be selected are managed by a list of window identifiers.

When the user depresses a particular key for selection of a window to be associated with a certain input, input associated window selector means 13 selects one window identifier according to the list of window identifiers stored in window identifier list storage means 12. The selected window identifier is outputted to window system 11 as an indicator of the window to be associated with the input. Window system 11 indicates on the display that the window identified by that identifier is associated with the input of interest.

Looking at the indication on the display, the user may start inputting at the identified window if it is a desired window associated with the input of interest. If the window displayed is not the desired window, the user again depresses the particular key for selection of a window to be associated with input. In response to the key depression, window selection means 13 selects the next window identifier in the window identifier list. By the procedure described above, the next window is identified and displayed as the one potentially associated with the input of interest.

In this way, windows potentially associated with the input of interest are successively selected according to the list of window identifiers until the desired window is identified and displayed as the one potentially associated with the input. Once the desired window is identified, the user completes the key manipulation for selecting the window to be associated with the input of interest.

According to the present invention, the user is capable of selecting the window to be associated with a certain input merely by continuing to depress a particular key. This offers the advantage of simple and rapid selection operation since there is no need to move the user's hand from the keyboard to a mouse and vice versa.

Further, if window identifier loading/deletion means 14 is provided, a desired list of window identifiers can be constructed by the user, and any window identifiers can be added to or deleted from the list as required.

Figure 2:
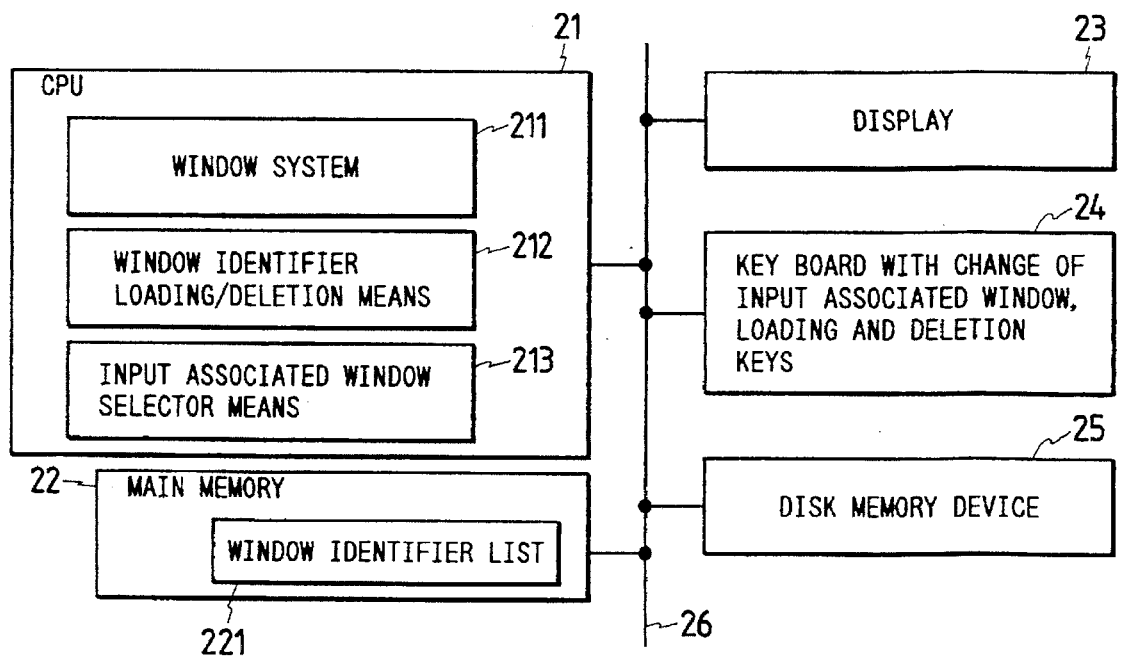
FIG. 2 is a block diagram showing a window managing system according to an example of the present invention.

FIG. 2 is a block diagram showing a window managing system according to a preferred embodiment of the present invention. As shown, this window managing system comprises CPU 21, main memory 22, display 23, keyboard 24, disk memory device 25 and other components (not shown) that are interconnected by bus 26.

CPU 21 includes basic window system 211, which performs window creation, deletion and display, as well as other management and control operations related to windows; window identifier loading/deletion means 212, which loads or deletes from window identifier list 221 a particular window identifier that is associated with the window designated by the user while operating keyboard 24; and input-associated window selector means 213 which, in response to the depression of a key on the keyboard 24 commanding the change of the input-associated window, selects the window associated with the input of interest by changing the window potentially associated with the input in accordance with the list of window identifiers. The functions of these means are fulfilled by executing the respective loaded processing programs in the main memory 22 through the capabilities of the hardware in CPU 21.

Main memory 22 stores not only the window identifier list 221 but also the various programs and data necessary to perform the respective functions of window identifier loading/deletion means 212 and input-associated window selector means 213 used in the preferred embodiment described herein. The windows to be displayed on display 23 are labelled with the associated window identifiers by means of window system 211 and the respective windows are managed by those identifiers.

Figure 3A:
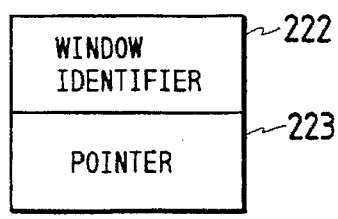
FIG. 3(a) is a diagram showing the elements of a list of window identifiers in the window managing system of the present invention.
Figure 3B:
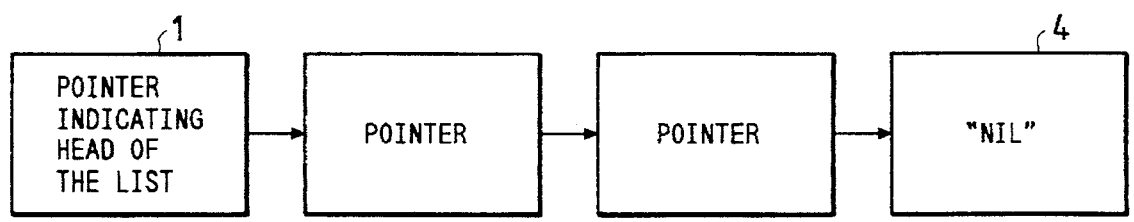
FIG. 3(b) is a diagram showing an example of the list of window identifiers in the window managing system of the present invention.
Figure 3C:
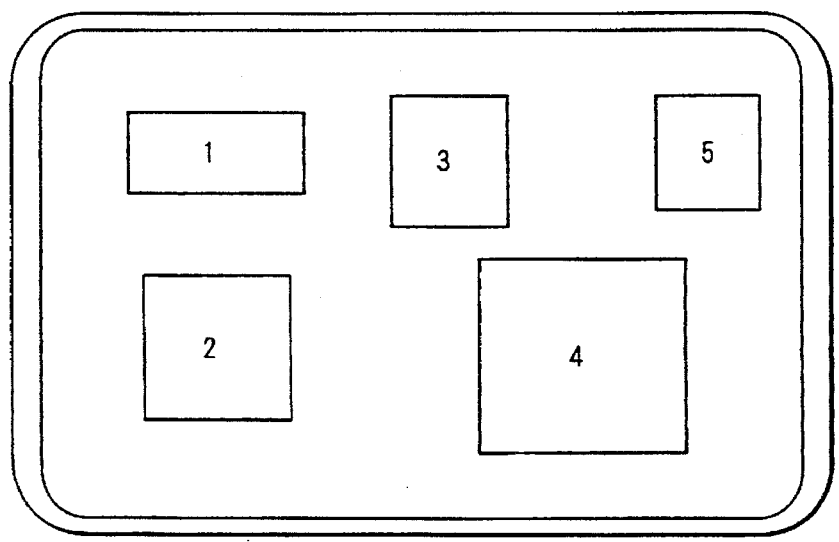
FIG. 3(c) is a diagram showing an example of a CRT on which a plurality of windows are displayed.

According to the preferred embodiment, the group of windows from which a suitable window to be associated with a certain input is managed by constructing window identifier list 221. As shown in FIG. 3(a), the basic elements of window identifier list 221 are window identifier 222 and pointer 223, which indicates where the identifier of the next window is located. These elements are connected in series, as shown in FIG. 3(b), to build a list of window identifiers. Window identifier list 221 has pointer 1 that indicates the address of window identifier 222 as the element at the head of the list. Pointer 4, as the last element located at the end of the list, has written therein "nil" signifying the absence of a subsequent element. Accordingly, the pointer indicates the element at the head of the list is "nil" in the initialized state of window identifier list 221 when it is "empty".

Display 23 displays a plurality of windows under the control of window system 211. One of the windows is selected as the one to be associated with a certain input, and the selection may typically be visualized by a blinking cursor.

Keyboard 24 contains not only a key for commanding the change of the input-associated window but also a key for commanding the loading or deletion of a certain window from the group of windows from which a suitable window to be associated with input can be selected.

Disk memory device 25 is an external memory device for storing various programs and data.

Figure 4:
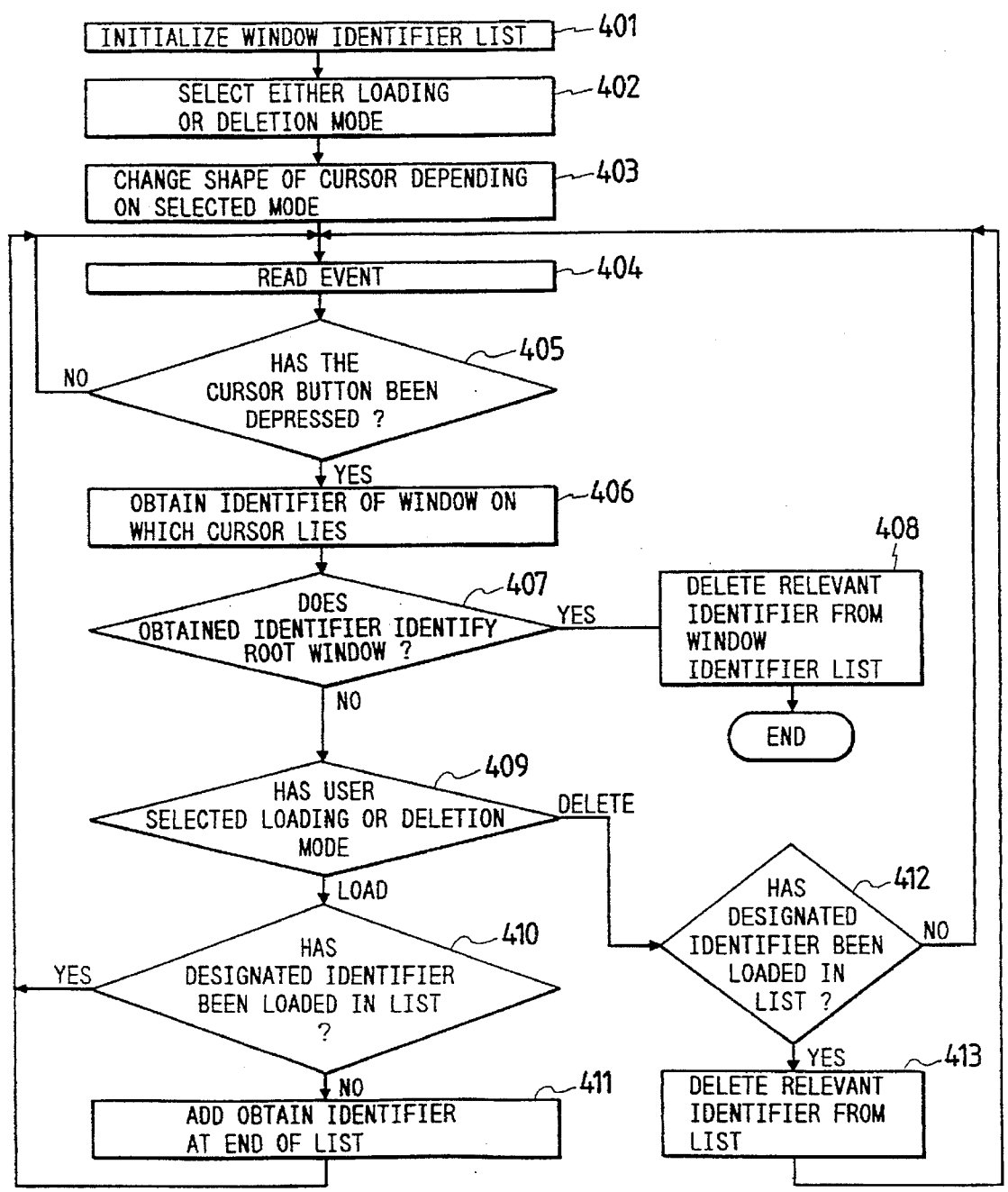
FIG. 4 is a diagram showing the sequence of steps for constructing a list of window identifiers in the window managing system of the present invention.

The operation of the window managing system having the construction described above is explained below with reference to FIG. 4, which is a flow diagram showing the sequence of steps for constructing a list of window identifiers.

First, window identifier list 221 is initialized (step 401). The value of pointer 1, which indicates the head of window identifier list 221, is "nil" so that the region Which has been allocated as the window identifier list is "opened".

By depressing either the loading (addition) or deletion key on keyboard 24, the user selects between two modes, i.e., loading (addition) and deletion from window identifier list 221 (step 402). Instead of key depression, a mouse may be used to achieve the selection from a menu on the display. Other modes of selection are considered to be apparent to those skilled in the art and are within the scope of the present invention.

The shape of the cursor is changed depending upon whether the loading (addition) or deletion mode is elected. In this specific example, assume the cursor indicates that the current mode is for window selection. Thus, the user will select the window to be associated with a certain input (step 403).

A plurality of windows are shown on display 23. Looking at display 23, the user selects the window which he or she wants to load from the group of windows that are potentially associated with the input selection. The window selection is accomplished by either operating keyboard 24 or using a pointing device such as a mouse (not shown).

Window identifier loading/deletion means 212 reads the event given by window system 211 (step 404), and checks to see if that event is a result of depression of the cursor button (step 405). If not, the reading of the event is repeated until the cursor button is depressed. When the cursor is depressed, the identifier of the window on which the cursor lies is obtained (step 406). Whether the obtained window identifier is that of a root window is checked (step 407). If the obtained window identifier is the root window, the process of window loading or deletion has been completed, the shape of the cursor is returned to the initial shape, and the sequence of processing ends (step 408).

The obtained window identifier will not be the root window identifier when the window to be loaded or deleted has been designated. Thus, in order to proceed with the process of loading or deleting that window, whether the mode selected by the user in step 402 is "loading" or "deletion" must be checked (step 409).

If the result of checking shows that the user selected a "loading" mode, window identifier list 221 is searched as to whether the designated window already has been loaded in window identifier list 221 (step 410). If the designated window has been loaded, no loading is done. Instead, the process proceeds to step 404, and another window is loaded into window identifier list 221.

If step 410 shows that the designated window is yet to be loaded into window identifier list 221, the window identifier obtained in step 406 is added at the end of the identifier list (step 411).

When the user selects a "deletion" mode, whether the identifier of the designated window has been loaded in the identifier list must be checked (step 412). If the identifier has been loaded, the identifier of the relevant window is deleted from the window identifier list 221 (step 413). This can be done by changing the associated pointer in the window identifier list 221. If the identifier of the designated window has not been loaded, the process returns to step 404 because of the absence of an identifier to be deleted.

The foregoing sequence of steps completes the construction of the window identifier list.

Figure 5:
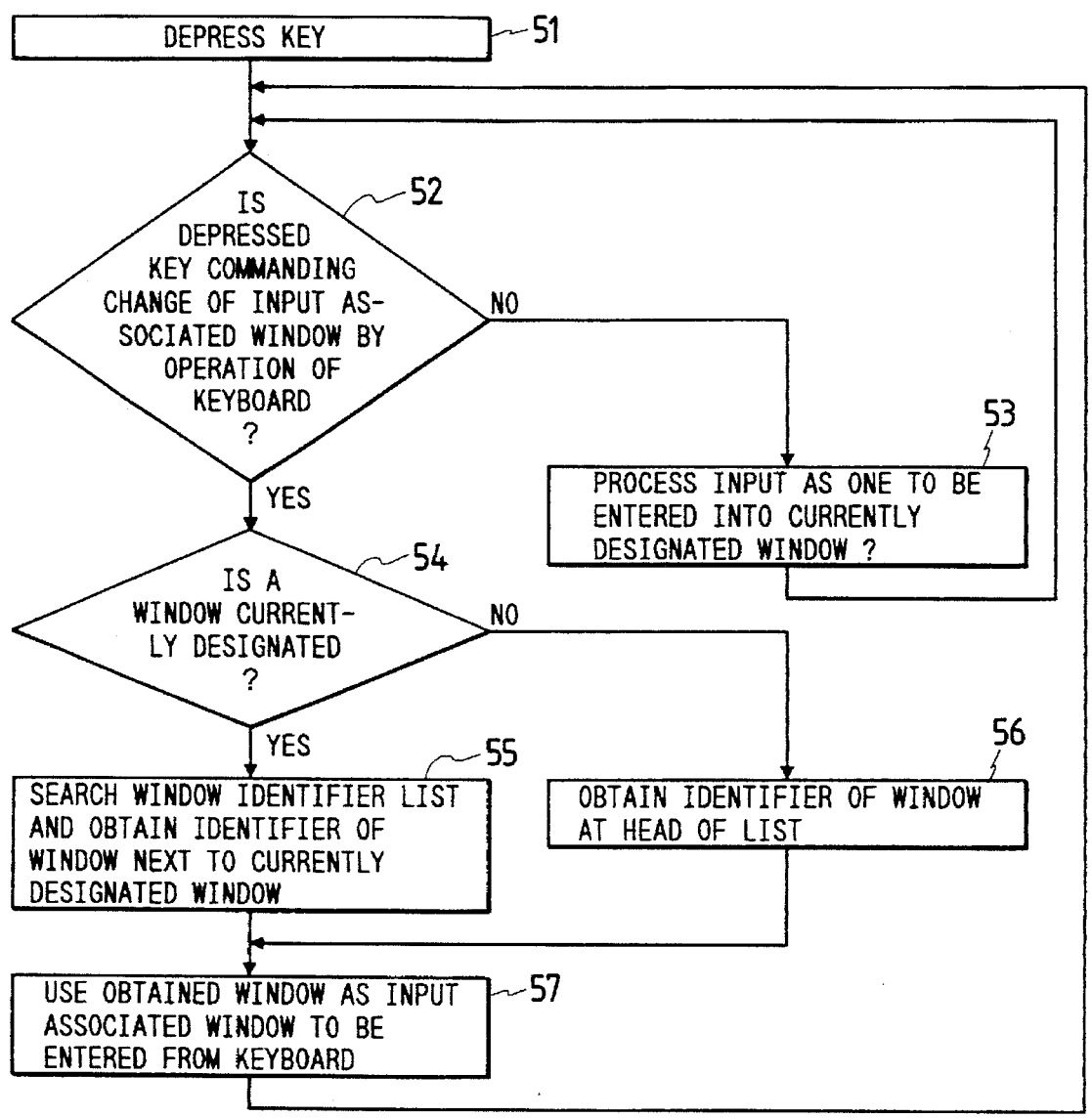
FIG. 5 is a diagram showing the sequence of changing the input-associated window by entry from a keyboard in the window managing system of the present invention.

FIG. 5 is a flow diagram showing the operation of input-associated window selector means 213, and specifically, the sequence of steps for changing the input-associated window by operation of the keyboard.

When the user depresses a key on the keyboard (step 51), window selector means 213 checks whether the depressed key is the one for commanding the change of the input-associated window by operation of the keyboard (step 52). If the answer is NO, the input is processed to be entered into the currently designated window (step 53). If the answer is YES, whether any window is currently designated is checked (step 54).

If either one of the windows in the window identifier list 221 has been designated, the list is searched to obtain the identifier of the window next to the currently designated window (step 55). If none of the windows is designated as the one to be associated with the input, the window identifier at the head of window identifier list 221 is obtained (step 56).

If a certain window identifier is obtained, the input-associated window to be entered from the keyboard is changed to the window identified by that identifier (step 57). In other words, input-associated window selector means 213 transfers the obtained window identifier to window system 211 as the one associated with the input of interest. Then window system 211 performs the necessary processing so that the input is entered into the window identified by that identifier.

The foregoing operation enables the user to change the input-associated window by manipulation of keyboard 24. Each time the key commanding the change of the input-associated window is depressed, one of the windows in window identifier list 221 becomes compatible with the entry of input in accordance with the order determined by window identifier list 221, and the state of its compatibility with the entry of input is shown on display 23. The user, as he or she looks at the display 23, successively changes the input-associated windows by depressing the particular key. Thus, the window into which the user desires to enter input data readily can be located. The searching operation involves no more than successively depressing the same key, and the operation can be accomplished in an easy and quick way since there is no need to move the user's hand from the keyboard to a mouse or vice versa.

According to the present invention, the user is capable of selecting the window to be associated with a certain input merely by continuing to depress a particular key. This offers the advantage of simple and rapid selection operation since there is no need to move the user's hand from the keyboard to a mouse or vice versa.

Further, if window identifier loading/deletion means 14 is provided, a desired list of window identifiers can be constructed by the user and any window identifiers can be added to or deleted from the list as required.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A window managing system for managing and concurrently displaying a plurality of windows on a display of the window managing system, said display being common to the plurality of windows, said window managing system comprising:

main memory means having list storage means for storing an identifier list and a plurality of window identifiers each associated with one of the plurality of windows;

a keyboard connected to the window managing system and having a plurality of keys allowing input to the window managing system; and a central processing unit, the central processing unit, the display, the keyboard, and the main memory means being interconnected via a bus in the window managing system, said central processing unit comprising:

window identifier loading/deletion means, connected to the list storage means, for loading selected window identifiers from the plurality of window identifiers to the identifier list or deleting selected window identifiers from the identifier list, wherein the selected window identifiers are less than the plurality of window identifiers, window selector means, responsive to a depression of a selector key of the keyboard, and connected to the list storage means, for selecting a specified window identifier from the plurality of window identifiers of the identifier list by depressing said selector key until said specified identifier is selected, and a window system, connected to the window selector means and the window identifier loading/deletion means, for creating, deleting, displaying, and controlling the plurality of windows.

2. The window managing system according to claim 1, wherein the list storage means includes a pointer which indicates a sequential order of window identifiers in the identifier list.

3. The window managing system of claim 1, wherein the window identifier loading/deletion means loads and deletes selected window identifiers to and from the identifier list in response to depression of a loading/deletion key of the keyboard, wherein said loading/deletion key is different than said selector key and is specifically identified with the window managing system on the keyboard.

4. The window managing system of claim 1, wherein the window identifier loading/deletion means loads selected window identifiers from the plurality of window identifiers to the identifier list in response to depression of a loading key of the keyboard which is specifically associated with the window managing system on the keyboard for loading, and deletes selected window identifiers from the identifier list, in response to depression of a deletion key of the keyboard which is specifically associated with the window managing system on the keyboard for deleting, and wherein the selector, loading and deletion keys are all distinct from each other.

5. The window managing system of claim 1, wherein the window selector means selects each specified window identifier sequentially from the identifier list.

* * * * *